US011054008B2

(12) United States Patent
Mueller et al.

(10) Patent No.: US 11,054,008 B2
(45) Date of Patent: Jul. 6, 2021

(54) RANGE-SHIFT TRANSMISSION AND TRANSMISSION ARRANGEMENT HAVING A RANGE-SHIFT TRANSMISSION

(71) Applicant: DEERE & COMPANY, Moline, IL (US)

(72) Inventors: David Mueller, Stutensee (DE); Rainer Gugel, Planckstadt (DE); Andrew K. Rekow, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 664 days.

(21) Appl. No.: 15/898,256

(22) Filed: Feb. 16, 2018

(65) Prior Publication Data
US 2018/0172123 A1    Jun. 21, 2018

Related U.S. Application Data

(63) Continuation of application No. PCT/EP2016/069068, filed on Aug. 10, 2016.

(30) Foreign Application Priority Data

Aug. 18, 2015 (DE) .......................... 102015215726.1

(51) Int. Cl.
*F16H 37/04* (2006.01)
*F16H 3/00* (2006.01)
(Continued)

(52) U.S. Cl.
CPC .......... *F16H 37/042* (2013.01); *F16H 3/006* (2013.01); *F16H 3/087* (2013.01); *F16H 57/033* (2013.01); *F16H 2200/0078* (2013.01)

(58) Field of Classification Search
CPC .......... F16H 3/006; F16H 3/087; F16H 3/091; F16H 37/042; F16H 37/043; F16H 57/033; F16H 2200/0078
(Continued)

(56) References Cited

U.S. PATENT DOCUMENTS 9,670,991 B2 *  6/2017  Eo ........................... F16H 3/006
2007/0266812 A1  11/2007  Asada
(Continued)

FOREIGN PATENT DOCUMENTS

CN   201 858 316 U    6/2011
DE   199 44 792 A1    4/2000
(Continued)

OTHER PUBLICATIONS

The International Search Report and the Written Opinion of the International Searching Authority issued in counterpart application No. PCT/EP2016/069068, dated Oct. 18, 2016 (16 pages).
(Continued)

*Primary Examiner* — Joseph Brown

(57) ABSTRACT

A range-shift transmission has a range input shaft, on which gear wheels of gear pairs of at least two range groups are arranged coaxially. The range input shaft is drivingly connected to a range output shaft via a gearwheel pair of a range group. The range-shift transmission has a second input shaft arranged coaxially and rotatably relative to the range input shaft.

10 Claims, 5 Drawing Sheets

(51) Int. Cl.
  *F16H 57/033*  (2012.01)
  *F16H 3/087*  (2006.01)
(58) Field of Classification Search
  USPC .......................................................... 74/745
  See application file for complete search history.

(56) References Cited

U.S. PATENT DOCUMENTS

| | | | | |
|---|---|---|---|---|
| 2013/0095975 | A1* | 4/2013 | Otten | F16H 37/046 |
| | | | | 475/218 |
| 2014/0033843 | A1* | 2/2014 | Van Druten | F16H 37/042 |
| | | | | 74/325 |
| 2016/0223061 | A1* | 8/2016 | Park | F16H 3/006 |
| 2016/0298741 | A1* | 10/2016 | Eo | F16H 3/006 |

FOREIGN PATENT DOCUMENTS

| | | | |
|---|---|---|---|
| DE | 10133919 A1 | 1/2003 | |
| DE | 10 2010 029 597 A1 | 12/2011 | |
| DE | 102012213224 A1 | 1/2014 | |
| EP | 1 624 232 A1 | 2/2006 | |
| GB | 1445618 A | 8/1976 | |
| WO | WO-2008151443 A1 * | 12/2008 | ......... F16D 25/0638 |
| WO | 2012 112028 A2 | 8/2012 | |
| WO | 2017 029174 A1 | 2/2017 | |

OTHER PUBLICATIONS

German Search Report issued in counterpart application No. 102015215726.1 dated Jul. 13, 2016 (08 pages).

* cited by examiner

RANGE-SHIFT TRANSMISSION AND TRANSMISSION ARRANGEMENT HAVING A RANGE-SHIFT TRANSMISSION

RELATED APPLICATIONS

This application is a continuation application of International Application PCT/EP2016/069068, filed Aug. 10, 2016, which claims priority to German Application Ser. No. 102015215726.1, filed Aug. 18, 2015, the disclosures of which are hereby expressly incorporated by reference in their entirety.

FIELD OF THE DISCLOSURE

The present disclosure relates to a range-shift transmission having a range input shaft, on which at least two range groups are arranged coaxially, wherein the range input shaft can be drivingly connected to a range output shaft via a gearwheel pair of a range group. The disclosure further relates to a transmission arrangement having a range-shift transmission.

BACKGROUND

Transmission arrangements for agricultural vehicles, such as tractors or harvesters having multiple gear units arranged in succession, are known in the prior art. These transmission arrangements are used to meet the high demands in regard to a ratio spread that is as sensitive as possible but also as wide as possible, as is required for agricultural working vehicles. For the same reasons, these transmissions are also used in the utility vehicle and construction machine fields.

An agricultural vehicle transmission having multiple transmission units connected in series can be found in DE 10 2010 029 597 A1. Different transmission units such as planetary gears, double-clutch gearboxes, and range-shift transmissions are coupled to one another therein. The range-shift transmission therein has an input shaft, an output shaft, and multiple range groups for different speed stages.

There is a need, however, for improving the modularity and variability of a transmission arrangement having a range-shift transmission.

SUMMARY

In one embodiment of the present disclosure, a range-shift transmission has a range input shaft, on which a least two range groups are arranged coaxially, wherein this range input shaft can be drivingly connected to a range output shaft via a gearwheel pair of a range group. The range-shift transmission also has a second input shaft in the form of an additional range input shaft that is arranged coaxially and rotatably relative to the group input shaft.

The provision of two inputs, namely the range input shaft and the second input shaft, on the range-shift transmission creates the precondition for being able to adapt the range-shift transmission to one or more (more particularly two) outputs of a great variety of types of upstream gearboxes. This renders conventional complex design changes of the range-shift transmission to adapt to different upstream base transmissions unnecessary.

The different base transmissions can be, for example, an eight-speed double-clutch transmission with two outputs, a four-speed transmission with one output, an infinitely variable transmission (IVT), a continuously variable transmission (CVT) or a power shift transmission (PST).

Two different rotational speeds can be provided for the range-shift transmission because of its two inputs, so that the individual range groups, i.e., if a suitable actuation or energization is provided for the range groups or their gear wheel pairs, can be optionally driven at the speed of the range input shaft or at the speed of the second input shaft. In this way, the entire spectrum of speeds of the range output shaft can be subdivided finely. For example, the gradation of speeds and gears for a base transmission with one output and a downstream range-shift transmission can be doubled merely by the two inputs of the range-shift transmission. Independently of this, a finer gradation corresponding to the number of range groups used can be created for all upstream base transmissions. With a four-speed base transmission with one output and a downstream range-shift transmission with three range groups, for example, a subdivision with 24 (4×2×3) gear stages can be created. With a four and eight speed base transmission with two outputs and a downstream range-shift transmission with three range groups, a subdivision of 24 (8×3) gear stages can be created.

Considered overall, this range-shift transmission is capable of achieving finer gradations within the transmission arrangement without special additional expense. At the same time, this range-shift transmission supports a structured modular construction of a transmission arrangement without expensive adaptation measures of the range-shift transmission. This results in a greater variety of applications and greater functionality for this range-shift transmission cost-effectively with regard to the interaction thereof with different base transmissions.

The range-shift transmission has multiple, in particular three, range groups. Each of these range groups covers a different speed range at the range output shaft.

For a vehicle designed as a tractor, for example, the range-shift transmission offers a number of fields of operation corresponding to the number of range groups. In particular, three range groups are provided for three fields of operation. A first field of operation, "fieldwork" for example, can be designed for applications for heavy work on the field in which mainly heavy towing work in a lower speed range (e.g. between 2 and 11 km/h) is performed. A second field of operation, "power takeoff operation," can be designed for applications involving lighter towing work on the field using a power takeoff drive wherein a medium speed range (e.g. between 4.5 and 18 km/h) can be desired. The third field of operation, "transport," for example, can be designed for transport work at a higher-speed range from 14 km/h to the highest speed. With the aid of the above-described two inputs, which provide different rotational speeds, the fields of operation can be coordinated sufficiently granularly that they support a continuous curve of efficiency or power loss for the transmission arrangement over the entire spectrum of rotational speed or ground speed of the vehicle. This in turn facilitates the implementation of optimized automated transmission mechanisms, particularly for applying driving strategies for reduced fuel consumption.

As already mentioned, the individual range groups have at least one gear wheel pair and each gear wheel pair contains a gear wheel arranged coaxially on the range input shaft. At least one of these gear wheels is co-rotatably connected to the range input shaft or the second input shaft and can then be drivingly connected by means of a shifting device to the respective other shaft, i.e., the second input shaft or the range input shaft. In this manner, a technically simple and cost-effective design guarantees the provision of two different rotational speeds for one range group corresponding to a defined shifting strategy. In addition, this shifting device also allows pre-engagement or preselection of a subsequent gear stage so that any interruption of the driving connection between the respective input and the range output shaft of the range-shift transmission is avoided during the shifting between the gear stages. The range-shift transmission thus supports interruption-free power shifting during shifting operation.

Here and below, the term shifting device stands for devices or components with which gear wheels or gear wheel pairs can be actuated or energized. Examples of shifting devices that can used include synchronizing devices, clutches (e.g. multi-plate clutch, claw clutch) or braking devices (e.g., for blocking a ring gear of a planetary gear unit).

In one embodiment, the range input shaft and the second input shaft are each co-rotatably connected to at least one of the above-described coaxial gear wheels. Thereby the range groups can be distributed onto the range input shaft and the second input shaft. This distribution supports a compact and axially short structure of the range-shift transmission.

One gear wheel of a range group is co-rotatably fixed to the range shaft, while a gear wheel of a successive shift range, i.e., in the direction of a higher or lower rotational speed on the range output shaft, is co-rotatably fixed to the second input shaft. This arrangement supports a simple transmission design for an interruption-free power shifting at the range output shaft. If there is an intended change of the range group, for example, with an appropriate actuation or energization of the gear wheel pairs at the range output shaft, the subsequent gear stage can be preselected or pre-engaged at the range output shaft before this subsequent gear stage is drivingly connected to the range input shaft or the second input shaft, more particularly by shifting the above-mentioned shifting device.

In another embodiment, at least one range group has two gear wheel pairs, wherein the gear wheel of the first gear wheel pair arranged coaxially on the range input shaft is co-rotatably connected to the range input shaft and the gear wheel of the other gear wheel pair that is arranged coaxially on the range input shaft is co-rotatably connected to the second input shaft. In this manner, a shifting strategy within a range group can dispense with the actuation of shifting devices between the range input shaft and the second input shaft. The transmission ratios of these two gear wheel pairs can be exactly identical, but also different, so long as this leads to an improved gear speed distribution for a uniform distribution of the available travel speed range of the vehicle. This applies especially in connection with staged transmissions.

A shifting device is arranged at the range output shaft between two range groups. Depending on an axial shifting position, this shifting device can drivingly connect one of the two range groups or the gear wheel pair thereof. In particular, a shifting group is provided between all successive range groups. A shifting device arranged in this manner enables preselection or pre-engagement of the subsequent gear stage during the shifting operation, so that a power shift into the subsequent gear stage or range group can be implemented without interruption of the driving connection between an input of the range-shift transmission and the range output shaft thereof.

The second input shaft of the range-shift transmission is formed as a hollow shaft and thereby supports a space-saving construction of the range-shift transmission.

The range output shaft is formed as a differential driveshaft and can drive a wheel axle of a vehicle in order to implement front wheel or rear wheel drive.

As already mentioned, the base transmission can have two outputs. In particular, one output is drivingly connected to the range input shaft of the range-shift transmission while the other output is drivingly connected to the second input shaft of the range-shift transmission. At least one of the two driving connections is designed as a direct mechanical link with unchanged rotational speed. This direct mechanical link is implemented in particular as a rotationally fixed connection. The modular structure of the transmission arrangement is thus achieved with a particularly simple and cost-effective design.

In another embodiment, the base transmission of the range-shift transmission has merely one output. It can selectively be drivingly connected to the range input shaft or the second input shaft of the range-shift transmission, whereby the number of gear stages of the base transmission is doubled and thus a finer gradation of the transmission arrangement is achieved.

The driving connection between the output of the base transmission and the range input shaft of the range-shift transmission is a direct mechanical link with unchanged rotational speed. The driving connection between the output of the base transmission and the second input shaft of the range-shift transmission contains a transmission device, whereby the rotational speed of the base transmission output is modified in a defined manner and can be provided either reduced or increased at the second input shaft of the range-shift transmission. In this way, a minimum or maximum output rotational speed at the range output shaft can be varied in a technically simple manner. It is merely necessary to exchange individual gear wheels or gear wheel pairs in the range-shift transmission, while the remaining structure of the range-shift transmission (housing, shaft arrangement, bearing concept, etc.) can remain the same. This additionally increases the easy compatibility of the range-shift transmission in different transmission arrangements. The above-mentioned variation of the output rotational speed can satisfy different technical requirements of the respective vehicle, different customer requirements and also different national legal requirements, cost-effectively with the same range groups or gear wheel pairs.

To satisfy different requirements it can make sense, particularly in conjunction with a variation of a minimum or maximum output speed at the range output shaft, to modify individual or all gear wheel pairs of a range-shift transmission merely with respect to the co-rotatable arrangement thereof on the range input shaft or the second input shaft. This likewise contributes to the multifunctional character of the range-shift transmission without special technical effort.

The transmission device for a driving connection between an output of the base transmission and the second input shaft of the range-shift transmission can be formed in different ways. Gear wheel pairs (spur gear unit), planetary gear units or planetary gear units with two axially offset sun gears are available inexpensively and with low assembly expense.

To support the modular and thus assembly-friendly construction of the transmission arrangement, the transmission unit between the output of the base transmission and the second input shaft of the range-shift transmission is a component of a transmission unit that is connected between the base transmission and the range-shift transmission in the direction of force flow.

As already mentioned, an output of the base transmission can be drivingly connected selectively to the range input shaft or to the second input shaft of the range-shift transmission. At least one shifting device is provided for this purpose. This shifting device can be designed, for example, as a clutch device for engaging and interrupting a force flow connection. For example, two shifting devices of this kind can be provided, wherein the first shifting device is arranged between an output of the base transmission and the range input shaft of the range-shift transmission, while the other shifting device is arranged between the same base transmission output and the second input shaft of the range-shift transmission. By a suitable, more particularly simultaneous, actuation of these two shifting devices, the force flow connection between an output of the base transmission and the range-shift input shaft can be interrupted and simultaneously the force flow connection between the same base transmission output and the second input shaft of the range-shift transmission can be engaged. If the shifting devices are appropriately actuated, the respective force flow connection can also assume the inverse state, i.e., be interrupted rather than engaged or engaged rather than interrupted.

The modular, assembly-friendly construction of the transmission arrangement is further supported if the above-mentioned at least one shifting device for selective driving connection of an output of the base transmission to the range input shaft or the second input shaft of the range-shift transmission, as well as the described transmission device, is a component of the above-mentioned transmission unit that is connected between the base transmission and the range-shift transmission in the direction of force flow.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawing, wherein.

DETAILED DESCRIPTION

Figure 1:
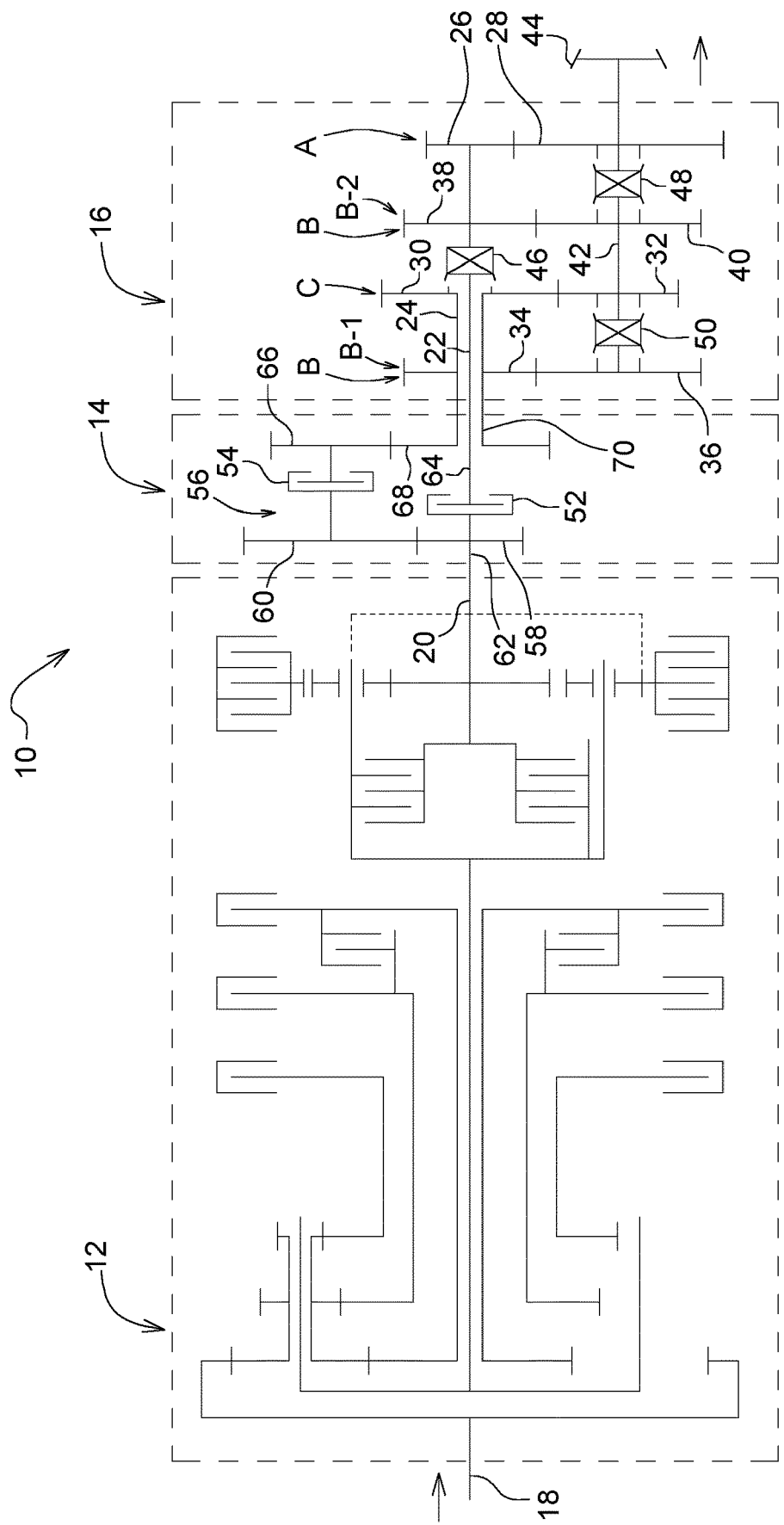
FIG. 1 shows a transmission layout of a first transmission arrangement.

FIG. 1 shows a transmission arrangement 10 according to the present disclosure. The transmission arrangement 10 has a base transmission 12, a transmission unit 14 and a range-shift transmission 16. The range-shift transmission 16 is downstream of the base transmission 12 and the transmission unit 14. The transmission unit 14 is therefore connected between the base transmission 12 and the range-shift transmission 16.

The base transmission 12 can be any transmission having an input shaft 18 and a single output in the form of an output shaft 20. It is illustrated as a conventional 4-speed transmission. The structure and mode of operation thereof is widely known and will therefore not be described in detail.

The rotational speed of an internal combustion engine is provided at the input shaft 18. The output shaft 20 is drivingly connected to the range-shift transmission 16 in a manner yet to be described.

The range-shift transmission 16 contains two inputs in the form of a range input shaft 22 and a second input shaft 24 in the form of a hollow shaft, which is arranged coaxially and rotatably thereto. Three range groups A, B and C are provided, wherein a different number of (at least two) range groups can be provided. Range group A has a gear wheel pair with meshing gear wheels 26 and 28. Range group C has a gear wheel pair with meshing gear wheels 30 and 32. Range group B has a first gear wheel pair B-1 with meshing gear wheels 34, 36 and a second gear wheel pair B-2 with meshing gear wheels 38, 40. The transmission ratios of the two gear wheel pairs B-1 and B-2 are dimensioned identically or nearly identically.

Depending on the actuation, yet to be described, either the range input shaft 22 or the second input shaft 24 can be drivingly connected to a range output shaft 42 via a gear pair of a range group A, B, C. The range output shaft 42, which is arranged parallel to the group input shaft 22, has a bevel gear 44 at the axial output end as a drive gear wheel for an additional transmission. The range output shaft 42 is designed as a differential driveshaft for driving a wheel axle of a vehicle.

The gear wheels 26, 30, 34, 38 of gear wheel pairs A, B-1, B-2, C are arranged coaxially to the range input shaft 22 and the second input shaft 24. In the embodiment shown in FIG. 1, the gear wheels 26, 38 of the gear wheel pairs A, B-2 are fixed co-rotatably to the range input shaft 22, while the gear wheels 30, 34 of the gear wheel pairs C, B-1 are fixed co-rotatably to the second input shaft 24. An axially movable shifting device 46 (e.g., a synchronization device) is fixed co-rotatably to the range input shaft 22. By appropriate actuation of this shifting device 46, the gear wheels 26, 38 co-rotatably fixed to the range input shaft 22 can be drivingly connected to the second input shaft 24, or the gear wheels 30, 34 fixed co-rotatably to the second input shaft 24 can be drivingly connected to the range input shaft 22.

Proceeding from range group A, the gear wheels of the gear wheel pairs arranged coaxially on the range input shaft 22 have an increasing diameter, while the two gear wheels 34, 38 of the same range group B are dimensioned with identical or nearly identical diameters. Proceeding from range group A, the gear wheels of the gear wheel pairs arranged coaxially on the range output shaft 42 have a decreasing diameter, while the two gear wheels 36, 40 of the same range group B are dimensioned with identical or nearly identical diameters. With such a dimensioning of the gear wheel pairs, the range groups can be associated with the already described fields of operation of an agricultural vehicle, where range group A corresponds to the first operation field "fieldwork," range group B to the second field of operation "power takeoff operation" and range group C to the third field of operation "transport."

Two axially movable shifting devices 48, 50 (e.g., synchronization devices) are fixed co-rotatably to the range output shaft 42. The shifting device 48 is arranged axially between range group A and the gear wheel pair B-2 of range group B and, depending on an axial shifting position, can drivingly connect either the gear wheel pair of range group A or the gear wheel pair B-2 of range group B to the range output shaft 42. The shifting device 50, on the other hand, is arranged axially between range group C and the gear wheel pair B-1 of range group B and, depending on an axial shifting position, can drivingly connect either the gear wheel pair of range group C or the gear wheel pair B-1 of range group B to the range output shaft 42. Differing from this, the shifting elements 48, 50 can also be arranged on the input shafts 22, 24.

The output shaft 20 of the base transmission 12 according to FIG. 1 can selectively be drivingly connected to the range input shaft 22 or the second input shaft 24 of the range-shift transmission 16. For this purpose, the transmission unit 14 has a first clutch device 52, a second clutch device 54 and a transmission device 56. The transmission device 56 contains two gear wheel pairs. One gear wheel pair consists of meshing gear wheels 58, 60. The gear wheel 58 is fixed co-rotatably to an input shaft 62 of the transmission unit 14. This input shaft 62 is fixed co-rotatably to the output shaft 20 of the base transmission 12. The input shaft 62 is coupled via the first clutch device 52 to a first output shaft 64 of the transmission unit 14. The first output shaft 64 is in turn co-rotatably fixed to the range input shaft 22. In this way, a direct driving connection is established between the output shaft 20 of the base transmission 12 and the range input shaft 22, which can be engaged or interrupted depending on the actuation of the first clutch device 52.

The second clutch device 54 of the transmission unit 14 is capable, if there is an appropriate actuation, of interrupting a flow of force within the transmission device 56, i.e., more precisely between the two gear wheel pairs of this transmission device 56. The gear wheel pair of the transmission unit 56 that opposes the gear wheels 58, 60 consists of meshing gear wheels 66, 68. The gear wheel 68 is fixed co-rotatably to a second output shaft 70 of the transmission unit 14. This second output shaft 70 is arranged coaxially and rotatably relative to the first output shaft 64, constructed as a hollow shaft, and is fixed co-rotatably to the second input shaft 24 of the range-shift transmission 16.

If the first clutch device 52 is appropriately actuated or energized, a direct mechanical link from the output shaft 20 of the base transmission 12 to the range input shaft 22 of the range-shift transmission 16 is established. The rotational speed of the output shaft 20 is then provided unchanged at the range input shaft 22. The gear wheels 58, 60, 66, 68 of the transmission device 56 are dimensioned such that the rotational speed of the output shaft 20 is provided in a reduced form at the second input shaft 24 of the range-shift transmission 16, as long as the second clutch device 54 is appropriately actuated or energized. There is thus a lower rotational speed available at the second input shaft 24 than at the range input shaft 22.

By appropriately actuating or energizing the shifting devices 46, 48, 50 and the clutch devices 52, 54, the two gear stages (higher rotational speed at the range input shaft 22 and lower rotational speed of the second input shaft 24) can be changed within a range group A or B or C. A changeover between the individual range groups A, B, C can also be accomplished by means of the shifting devices 46, 48, 50 and the clutch devices 52, 54. In particular the shifting devices 46, 48, 50 on the range output shaft 42 enable a pre-engagement or preselection of the subsequent gear stage, thus preventing an interruption of the driving connection between the input (range input shaft 22 or second input shaft 24) and the range output shaft 42 of the range-shift transmission 16. After pre-engaging or preselecting the subsequent gear stage, the clutch devices 52, 54 can be appropriately actuated in order to provide the rotational speed corresponding to the subsequent gear stage at the input of the range-shift transmission 16 without interrupting the driving connection.

For the sake of example, assume that the second input shaft 24 is drivingly connected to the range output shaft 42 via the gear wheel pair B-1, i.e. via the gear wheels 34, 36. It is intended to shift to the subsequent gear stage (gear wheel pair B-2, gear wheels 38, 40). This subsequent gear stage is first preselected or pre-engaged by actuating the shifting device 48 such that the gear wheel 40 or the gear wheel pair B-2 is drivingly connected to the range output shaft 42. Then, a simultaneous shifting of the two clutch devices 52, 54 is sufficient to reach the subsequent gear stage and thus for the gear wheel pair B-2 to be driven at the rotational speed of the range input shaft 22.

It is then desired to shift to the range group C, for example, wherein the lower rotational speed (second input shaft 24) is to be in effect at the range group C. This gear stage is again initially preselected or pre-engaged by actuating the shifting device 50 such that the gear wheel 32 or the gear wheel pair C is drivingly connected to the range output shaft 42. Then, a simultaneous shifting of the two clutch devices 52, 54 is sufficient to reach the subsequent gear stage and thus for the gear wheel pair B-2 to be driven at the rotational speed of the second input shaft 24.

It is then desired to shift within the range group C, for example, wherein the lower rotational speed (range input shaft 22) is to be in effect at the range group C. This gear stage is again initially preselected or pre-engaged by actuating the shifting device 46 such that the gear wheel 30 or the gear wheel pair C is drivingly connected to the range input shaft 22. Then, a simultaneous shifting of the two clutch devices 52, 54 is sufficient to reach the preselected gear stage and thus for the gear wheel pair C to be driven at the rotational speed of the range input shaft 22.

Figure 2:
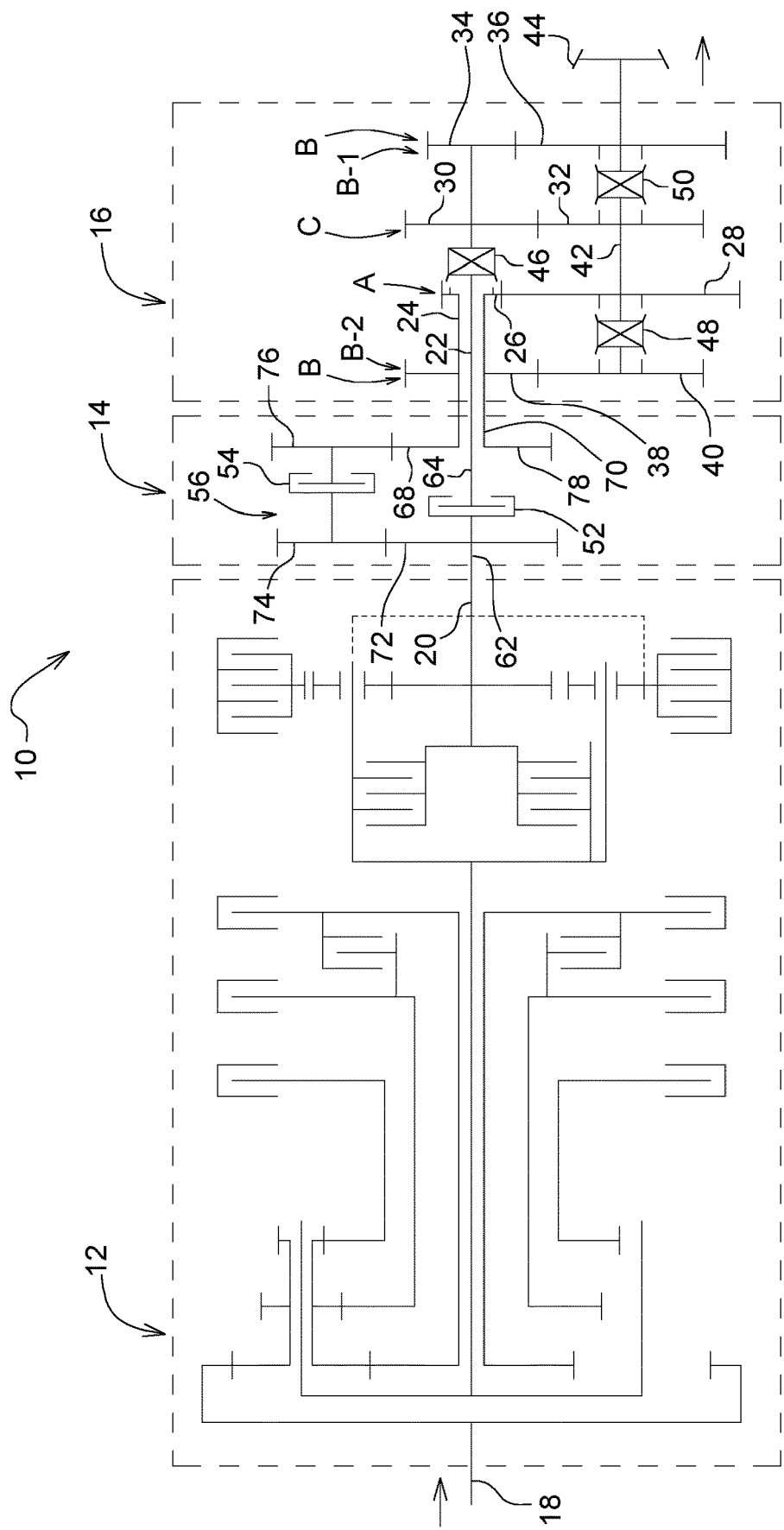
FIG. 2 shows a transmission layout of a second transmission arrangement.

The embodiment of a gear arrangement 10 shown in FIG. 2 differs from the embodiment in FIG. 1 with regard to the design of the transmission device 56 in that the transmission device 56 according to FIG. 2 converts the rotational speed present at the input shaft 62 into a higher rotational speed and provides it to the second input shaft 24 in this increased form. For this purpose, the meshing gear wheels 72, 74 and 76, 78, respectively, of the two gear wheel pairs of the transmission device 56 are accordingly dimensioned differently from the corresponding gear wheels 58, 60, 66, 68 in FIG. 1. Alternatively, cost-saving individual gear wheels 58, 60, 66, 68 according to FIG. 1 can be reused, but merely in a different order in the transmission device 56, in order to implement the embodiment according to FIG. 2.

Since the second input shaft 24 provides the higher rotational speed in the embodiment according to FIG. 2, in comparison to the range input shaft 22 of FIG. 2, the individual range groups A, B, C in the range-shift transmission 16 of FIG. 2 are arranged reversed in comparison to the embodiment according to FIG. 1. Thus the gear wheel pairs A and B-2 are again co-rotatably connected to the input at which the comparatively higher rotational speed is provided. The gear wheel pairs B-1 and C in FIG. 2 are again co-rotatably connected to the input at which the comparatively lower rotational speed is provided. By an appropriate actuation of the clutch devices 52, 54 according to FIG. 2, the range-shift transmission 16 according to FIG. 2 can in principle provide the same shifting functionality, apart from the modified rotational speeds, as that which was described above with reference to FIG. 1.

Figure 3:
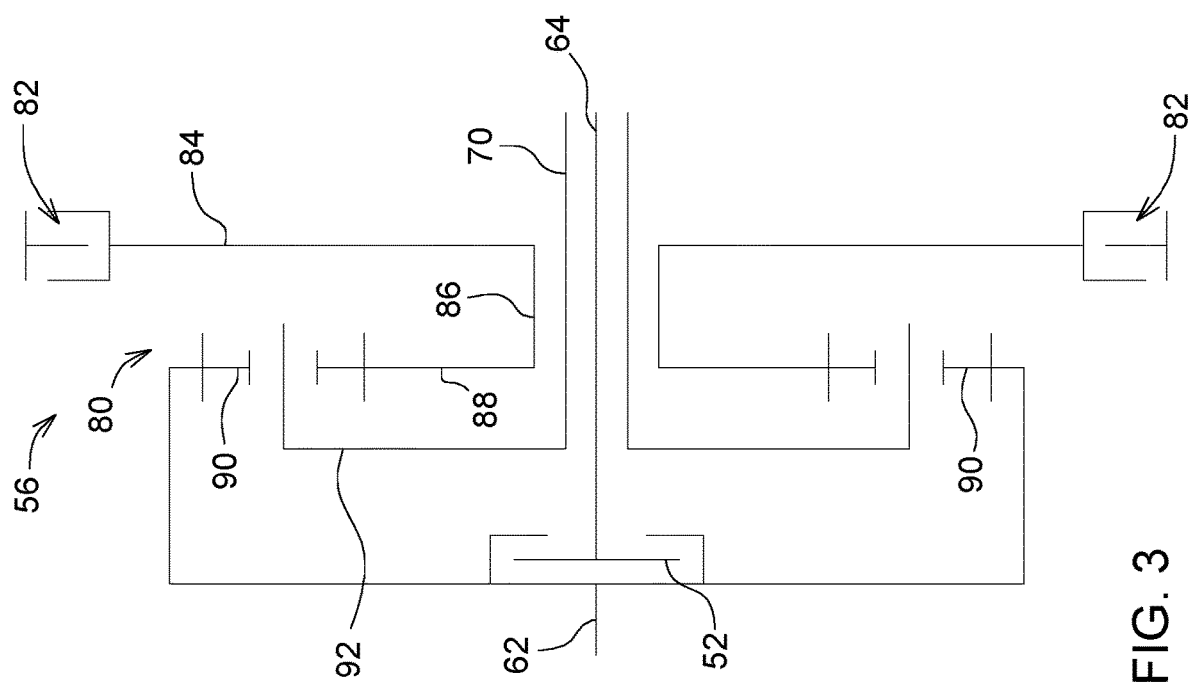
FIG. 3 shows a further embodiment of a transmission unit between the base transmission and the range-shift transmission in the transmission arrangement according to FIG. 1.

FIG. 3 shows an additional embodiment of a transmission device 56 for the transmission unit 14 according to FIG. 1. The rotational speed of the output shaft 20 is therefore provided at the first output shaft 64, while a converted lower rotational speed is provided at the second output shaft 70. A planetary gear unit 80 is used in this embodiment. The second clutch device 54 according to FIG. 1 is replaced by a brake device 82, which can block a connecting element 84 if actuated appropriately. The connecting element 84 is arranged on a hollow shaft 86 that bears a sun gear 88. The sun gear 88 meshes with a set of planet gears 90 which are mounted on a planet carrier 92. The planet carrier 92 is fixed co-rotatably to the second output shaft 70. By an appropriate actuation of the first clutch device 52 and the brake device 82 according to FIG. 3, the same shifting functionality as that described with reference to FIG. 1 can in principle be achieved for the range-shift transmission 16.

Figure 4:
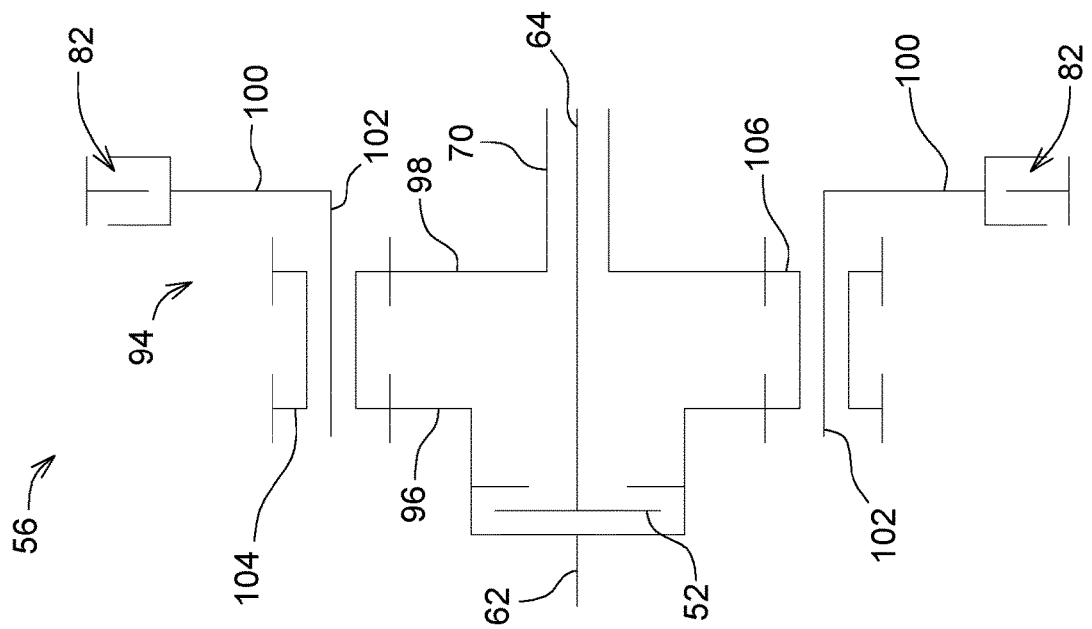
FIG. 4 shows a further embodiment of a transmission unit between the base transmission and the range-shift transmission in the transmission arrangement according to FIG. 1.

FIG. 4 shows an additional embodiment of a transmission device 56 for the transmission unit 14 according to FIG. 1 or FIG. 2. The rotational speed of the output shaft 20 is provided at the first output shaft 64, while a converted lower rotational speed is provided at the second output shaft 70. In this embodiment, a planetary gear unit 94 with two axially parallel sun gears 96, 98 is provided. The second clutch device 54 according to FIG. 1 is again replaced by a brake device 82, which can block a planet carrier 100 if actuated appropriately. The planet carrier 100 is connected to bearing axles 102, on which two axially parallel sets of planet gears 104, 106 are mounted. The planet gears 104 and 106 mesh with the respective sun gear 96 and 98. The sun gear 96 is connected to the input shaft 62 while the sun gear 98 is connected to the second output shaft 70. By an appropriate actuation of the first clutch device 52 and the brake device 82 according to FIG. 4, and an appropriate dimensioning of the numbers of teeth, the same shifting functionality as that described with reference to FIG. 1 or FIG. 2 can in principle be achieved for the range-shift transmission 16.

The embodiment of the transmission device 56 according to FIG. 4 is also suitable to replace the transmission device 56 according to FIG. 2 if there is an appropriate different dimensioning of the numbers of teeth of the two sun gears 96, 98. In other words, the transmission device 56 according to FIG. 4, with an appropriate specific design or actuation, can also be used to provide a higher or lower rotational speed at the second output shaft 70 than at the first output shaft 64.

Figure 5:
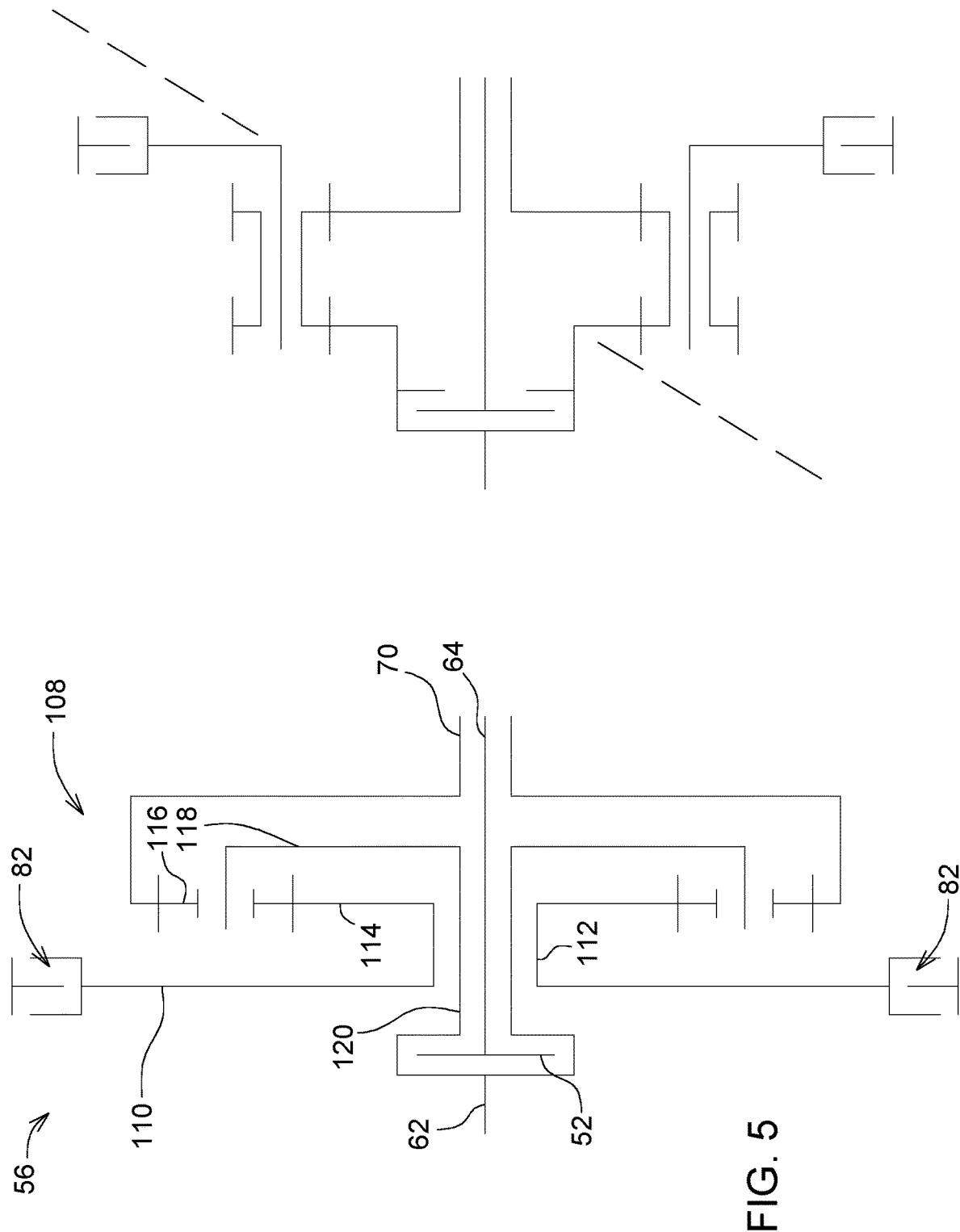
FIG. 5 shows a further embodiment of a transmission unit between the base transmission and the range-shift transmission in the transmission arrangement according to FIG. 2.

FIG. 5 shows an additional embodiment of a transmission device 56 for the transmission unit 14 according to FIG. 2. The rotational speed of the output shaft 20 can therefore be provided at the first output shaft 64, while a converted higher rotational speed is provided at the second output shaft 70. A planetary gear unit 108 is used in this embodiment. The second clutch device 54 according to FIG. 2 is again replaced by a brake device 82, which can block a ring gear 110 if actuated appropriately. The ring gear 110 is arranged on a hollow shaft 112 that bears a sun gear 114. The sun gear 114 meshes with a set of planet gears 116 which are mounted on a planet carrier 118. The planet carrier 118 is again fixedly connected to a hollow shaft 120 that is arranged on the clutch device 52. By an appropriate actuation of the first clutch device 52 and the brake device 82 according to FIG. 5, the same shifting functionality as that described with reference to FIG. 2 can in principle be achieved for the range-shift transmission 16.

Figure 6:
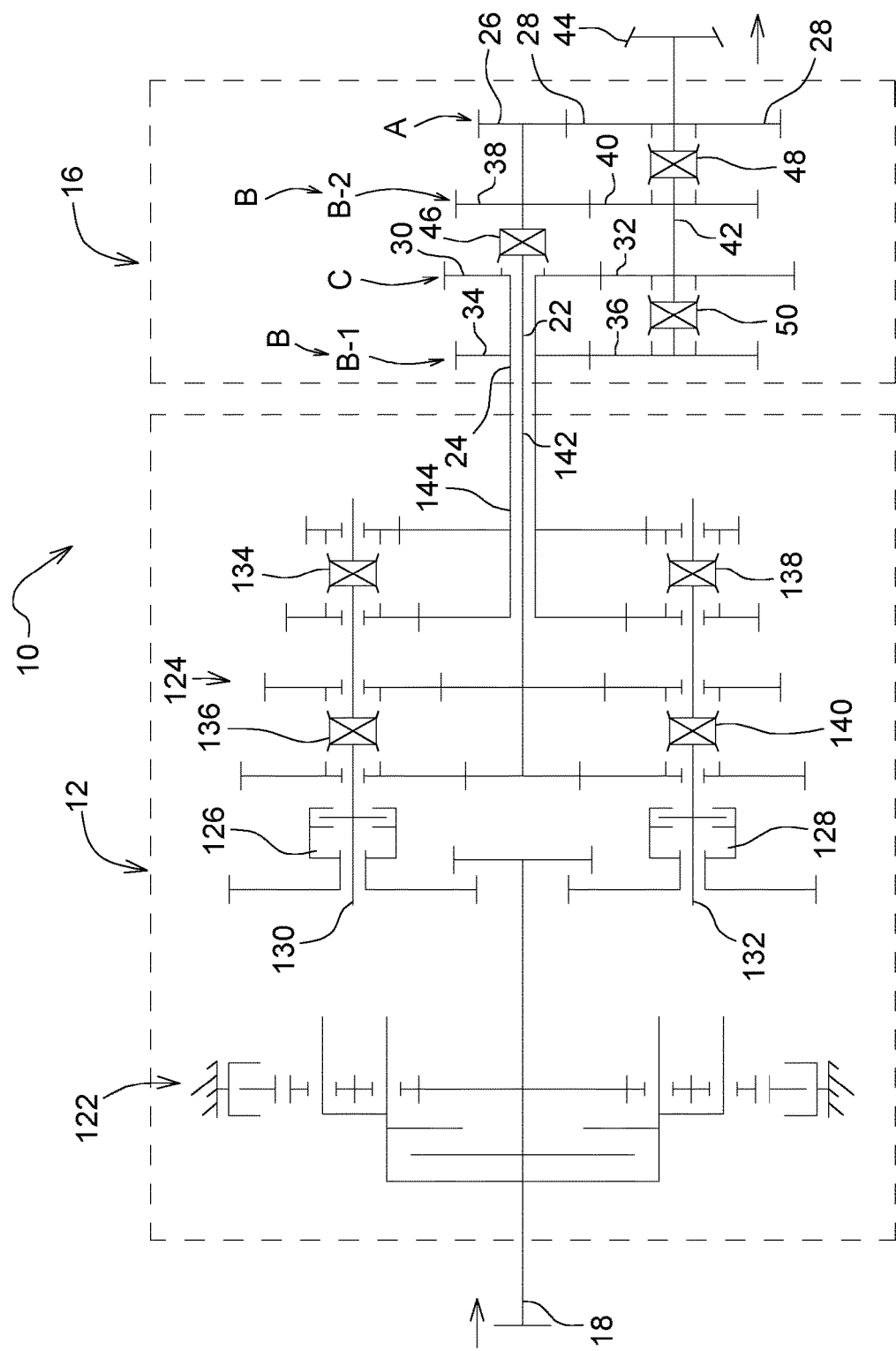
FIG. 6 shows a transmission diagram of a third transmission arrangement.

FIG. 6 shows a transmission arrangement 10 with a different conventional base transmission 12. This base transmission 12 contains a reversible double planetary gear unit 122, or a reversing gear unit, and a double-clutch drive gear unit 124. The double-clutch gear unit 124 normally has a first clutch device 126 and a second clutch device 128, associated with a respective layshaft 130, 132. The eight successive gear speeds are associated alternately with one of the two layshafts 130, 132. In the illustrated embodiment, gear stages 1, 3, 5, 7 are associated with layshaft 130 and gear stages 2, 4, 6, 8 with layshaft 132. By actuating shifting devices 134, 136, 138, 140, the different gear stages can be pre-engaged or preselected. Interaction with the two clutch devices 126, 128 enables shifting between the gear stages without causing an interruption of the driving connection between the input shaft 18 and the first output shaft 142 or the second output shaft 144.

In the embodiment according to FIG. 6, the two outputs of the base transmission are each co-rotatably connected to a respective input of the range-shift transmission 16, for example, flanged in a suitable manner. Consequently, the first output shaft 142 and the range input shaft 22, and the second output shaft 144 and the second input shaft 24 are respectively co-rotatably connected. A transmission unit 14 for adapting a different number of outputs of the base transmission and inputs of the range-shift transmission is superfluous, which further simplifies the modular structure of the transmission arrangement 10.

In the embodiment according to FIG. 6, the gear stages 1, 2, 3, 4 are associated with the second output shaft 144 and the gear stages 5, 6, 7, 8 with the first output shaft 142. The structure of the range-shift transmission 16 in FIG. 6 corresponds to the variant of FIG. 1. In FIG. 6, a lower rotational speed is provided at the second input shaft 24 in comparison to the range input shaft 22. As described with reference to FIG. 1, the range-shift transmission 16 according to FIG. 6, along with the shifting devices 46, 48, 50 thereof, has the advantage that for an engaged gear of base transmission 12 or the double-clutch transmission 124, different gradations between the ranges or range groups A, B, C can be pre-engaged or preselected and combined with a subsequent gear of the base transmission 12 to be engaged, wherein interruption-free shifting between the individual gradations of the range-shift transmission 16 comes into effect.

The differing configurations of the transmission unit 14 and the range-shift transmission 16 according to FIG. 1 and according to FIG. 2 are easily and cost-effective possible with largely identical components. Overall there is a single basic structure of the range-shift transmission 16 which, in combination with an appropriate transmission unit 14, can support the implementation of different transmission arrangements for different application purposes and requirement profiles, as shown for the sake of example with reference to FIG. 1, FIG. 2 and FIG. 6.

As described, a correspondingly finer gradation of gears and speed ranges can be achieved for different conventional base transmissions with the aid of the range-shift transmission 16, depending on the number of range groups available. For example, the 4-speed base transmission 12 according to FIG. 1 and FIG. 2 can be extended by means of the three range groups A, B, C and the intermediate-connected transmission unit 14 (two rotational speed stages) to twenty-four (4×2×3) gear stages. The base transmission 12 with eight speeds according to FIG. 6 can likewise be converted or extended by means of the three ranges or range groups A, B, C into twenty-four (8×3) gear stages. This degree of finer gradation of a conventional base transmission 12 is sufficiently efficient for many applications, particularly with respect to an optimized driving strategy (e.g., fuel savings) and increased driving comfort.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A range-shift transmission, comprising:
a range input shaft on which a first gear wheel of a first gear wheel pair and a first gear wheel of a second gear wheel pair are coaxially arranged and co-rotatably connected to the range input shaft;
a second input shaft arranged coaxially and rotatably relative to the range input shaft, the second range input shaft on which a first gear wheel of a third gear wheel pair and a first gear wheel of a fourth gear wheel pair are coaxially arranged and co-rotatably connected to the second input shaft, wherein the second input shaft is a hollow shaft, and wherein the second gear wheel pair and the fourth gear wheel pair have the same transmission ratio;
a single range output shaft on which a second gear of the first gear pair, a second gear of the second gear pair, a second gear of the third gear pair, and a second gear of the fourth gear pair are coaxially arranged, the single range output shaft drivingly connected via one of the gear wheel pairs to one of the range input shaft and the second input shaft;
a first shifting device arranged on the range input shaft axially between the second and third gear wheel pairs and, depending on an axial shift position, drivingly connects the second input shaft to the range input shaft;
a second shifting device arranged on the single range output shaft axially between the first and second gear wheel pairs and, depending on an axial shift position, drivingly connects one of the first and second gear wheel pairs to the single range output shaft; and
a third shifting device arranged on the single range output shaft axially between the third and fourth gear wheel pairs and, depending on an axial shift position, drivingly connects one of the third and fourth gear wheel pairs to the single range output shaft.

2. The range-shift transmission of claim 1, wherein the single range output shaft comprises a differential driveshaft for driving a wheel axle of a vehicle.

3. An arrangement of a plurality of transmissions connected one after another in a direction of a force flow, comprising:
a base transmission;
a range-shift transmission downstream of the base transmission, the range-shift transmission including a range input shaft on which a first gear wheel of a first gear pair and a first gear wheel of a second gear wheel pair are coaxially arranged and co-rotatably connected to the range input shaft;
a second input shaft arranged coaxially and rotatably relative to the range input shaft, the second range input shaft on which a first gear wheel of a third gear wheel pair and a first gear wheel of a fourth gear wheel pair are coaxially arranged and co-rotatably connected to the second input shaft, wherein the second input shaft is a hollow shaft, and, wherein the second gear wheel pair and the fourth gear wheel pair have the same transmission ratio;
a single range output shaft on which a second gear of the first gear pair, a second gear of the second gear pair, a second gear of the third gear pair, and a second gear of the fourth gear pair are coaxially arranged, the single range output shaft drivingly connected via one of the gear wheel pairs to one of the range input shaft and the second input shaft;
a first shifting device arranged on the range input shaft axially between the second and third gear wheel pairs and, depending on an axial shift position, drivingly connects the second input shaft to the range input shaft;
a second shifting device arranged on the single range output shaft axially between the first and second gear wheel pairs and, depending on an axial shift position, drivingly connects one of the first and second gear wheel pairs to the single range output shaft; and
a third shifting device arranged on the single range output shaft axially between the third and fourth gear wheel pairs and, depending on an axial shift position, drivingly connects one of the third and fourth gear wheel pairs to the single range output shaft;
wherein the arrangement of the plurality of transmissions results in twenty-four gear stages of the single range output shaft.

4. The arrangement of claim 3, wherein the base transmission has two outputs, the first output of the two outputs being drivingly connected to the range input shaft of the range-shift transmission and the other output being drivingly connected to the second input shaft of the range-shift transmission.

5. The arrangement of claim 3, wherein the base transmission has an output selectively drivingly connected to the range input shaft or the second input shaft of the range-shift transmission.

6. The arrangement of claim 5, further comprising a direct driving connection disposed between the output of the base transmission and the range input shaft of the range-shift transmission, and by a transmission device for driving connection between the output of the base transmission and the second input shaft of the range-shift transmission.

7. The arrangement of claim 6, wherein the transmission device comprises a component of a transmission unit connected between the base transmission and the range-shift transmission in the direction of force flow.

8. The arrangement of claim 5, further comprising at least one shifting device for selective driving connection of the output of the base transmission to the range input shaft or to the second input shaft of the range-shift transmission.

9. The arrangement of claim 8, wherein the at least one shifting device comprises a component of the transmission unit connected between the base transmission and the range-shift transmission.

10. The arrangement of claim 3, wherein the single range output shaft comprises a differential driveshaft for driving a wheel axle of a vehicle.

* * * * *